United States Patent
Nowicki et al.

(10) Patent No.: US 12,486,962 B1
(45) Date of Patent: Dec. 2, 2025

(54) VEHICLE LAMP ASSEMBLY HAVING T-SHAPED CONNECTOR

(71) Applicant: Ford Global Technologies, LLC, Dearborn, MI (US)

(72) Inventors: Nicholas James Nowicki, Southgate, MI (US); Ketan K. Desai, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/086,765

(22) Filed: Mar. 21, 2025

(51) Int. Cl.
  *F21S 43/19*  (2018.01)
  *F21V 19/04*  (2006.01)

(52) U.S. Cl.
  CPC .......... *F21S 43/195* (2018.01); *F21V 19/047* (2013.01)

(58) Field of Classification Search
  None
  See application file for complete search history.

(56) References Cited

U.S. PATENT DOCUMENTS 12,005,961 B2 6/2024 Scala et al.

FOREIGN PATENT DOCUMENTS

| CN | 107472119 B | * | 11/2023 | .............. B60Q 1/44 |
|---|---|---|---|---|
| DE | 102009019730 A1 | | 11/2010 | |
| DE | 102020121799 A1 | | 2/2022 | |
| EP | 1932749 B1 | | 3/2010 | |
| EP | 3587908 A1 | * | 1/2020 | .............. F21V 29/74 |
| FR | 3011804 A1 | * | 4/2015 | .............. B60Q 1/305 |

OTHER PUBLICATIONS

Innovation Q+NPL Search (Year: 2025).*

* cited by examiner

*Primary Examiner* — Anabel Ton
(74) *Attorney, Agent, or Firm* — Vichit Chea; Price Heneveld LLP

(57) ABSTRACT

A vehicle lamp assembly generally includes a housing having a light transmissive lens and one or more light bulb receptacles. One or more light bulbs are located in the one or more light bulb receptacles. A fascia assembly is configured to be assembled onto a vehicle. A T-shaped connector is provided on one of the housing and the fascia assembly, and a T-shaped slot is provided on the other of the housing and the fascia assembly. The T-shaped connector is configured to engage the T-shaped slot to allow the housing to align with the fascia assembly to allow servicing the lamp assembly. One or more fasteners are configured to fasten the housing onto the vehicle without removing the fascia assembly.

20 Claims, 6 Drawing Sheets

VEHICLE LAMP ASSEMBLY HAVING T-SHAPED CONNECTOR

FIELD OF THE DISCLOSURE

The present disclosure generally relates to a motor vehicle lamp assemblies, and more particularly relates to a vehicle lamp assembly configured with a connector assembly to enable the lamp assembly to be easily serviceable.

BACKGROUND OF THE DISCLOSURE

Motor vehicles are commonly equipped with various lamp assemblies including vehicle tail lamp assemblies generally located at the rear end corners of the motor vehicle. The vehicle tail lamp assemblies are typically fastened onto the vehicle body or a fascia member of the vehicle body using fastener devices. It may be desirable to provide for a vehicle lamp assembly that may be efficiently and effectively serviceable such as to enable replacement of a light bulb.

SUMMARY OF THE DISCLOSURE

According to a first aspect of the present disclosure, a vehicle lamp assembly may include a housing having a light transmissive lens and one or more light bulb receptacles. One or more light bulbs are located in the one or more light bulb receptacles. A fascia assembly is configured to be assembled onto a vehicle. A T-shaped connector is provided on one of the housing and the fascia assembly, and a T-shaped slot is provided on the other of the housing and the fascia assembly. The T-shaped connector is configured to engage the T-shaped slot to allow the housing to align with the fascia assembly to allow servicing the lamp assembly. One or more fasteners are configured to fasten the housing onto the vehicle.

Embodiments of the first aspect of the present disclosure can include any one or a combination of the following features:
- the vehicle lamp assembly is a vehicle tail lamp assembly;
- the one or more fasteners are located on a vehicle inboard side, and the T-shaped connector and T-shaped slots are located on a lower or outport side;
- the T-shaped connector is located on the housing and the T-shaped slot is located in the fascia assembly;
- the fascia assembly comprises a fascia bracket having the T-shaped slot;
- the fascia assembly further comprises a trim panel coupled to the fascia bracket;
- the T-shaped connector slides within the T-shaped slot;
- one or more alignment pins are configured to aligning the housing with the fascia during assembly of the vehicle lamp assembly onto the motor vehicle;
- the one or more alignment pins comprises one or more studs configured to snap into one or more grommets; and
- the one or more lamp bulbs are configured to be removable.

According to a second aspect of the present disclosure, a vehicle tail lamp assembly may include a housing having a light transmissive lens and one or more light bulb receptacles. One or more light bulbs are located in the one or more light bulb receptacles. A fascia assembly is configured to be assembled onto a vehicle. The fascia assembly comprises a fascia bracket having the T-shaped slot. A T-shaped connector is provided on one of the housing and the fascia assembly. The T-shaped connector is located on the housing and the T-shaped slot is located in the fascia assembly. A T-shaped slot is provided on the other of the housing and the fascia assembly. The T-shaped connector is configured to engage the T-shaped slot to allow the housing to align with the fascia assembly to allow servicing the lamp assembly. One or more fasteners are configured to fasten the housing onto the vehicle. The one or more fasteners are located on a vehicle inboard side, and the T-shaped connector and T-shaped slots are located on a lower or outport side.

Embodiments of the second aspect of the present disclosure can include any one or a combination of the following features:
- the fascia assembly further comprises a trim panel coupled to the fascia bracket;
- the T-shaped connector slides within the T-shaped slot;
- one or more alignment pins are configured to aligning the housing with the fascia during assembly of the vehicle lamp assembly onto the motor vehicle;
- the one or more alignment pins comprises one or more studs configured to snap into one or more grommets; and
- the one or more lamp bulbs are configured to be removable.

According to a third aspect of the present disclosure, a vehicle may have a body, a fascia assembly assembled onto the body, the fascia assembly, including a fascia bracket, and a vehicle tail lamp assembly. The vehicle tail lamp assembly may have a housing having a light transmissive lens and one or more light bulb receptacles. One or more light bulbs are located in the one or more light bulb receptacles. A fascia assembly is configured to be assembled onto a vehicle. A T-shaped connector is provided on one of the housing and the fascia assembly. A T-shaped slot is provided on the other of the housing and the fascia assembly. The T-shaped connector is configured to engage the T-shaped slot to allow the housing to align with the fascia assembly to allow servicing the lamp assembly. One or more fasteners are configured to fasten the housing onto the vehicle.

Embodiments of the second aspect of the present disclosure can include any one or a combination of the following features:
- the vehicle lamp assembly is a vehicle tail lamp assembly;
- the one or more fasteners are located on a vehicle inboard side, and the T-shaped connector and T-shaped slots are located on a lower or outport side; and
- the T-shaped connector is located on the housing and the T-shaped slot is located in the fascia assembly.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
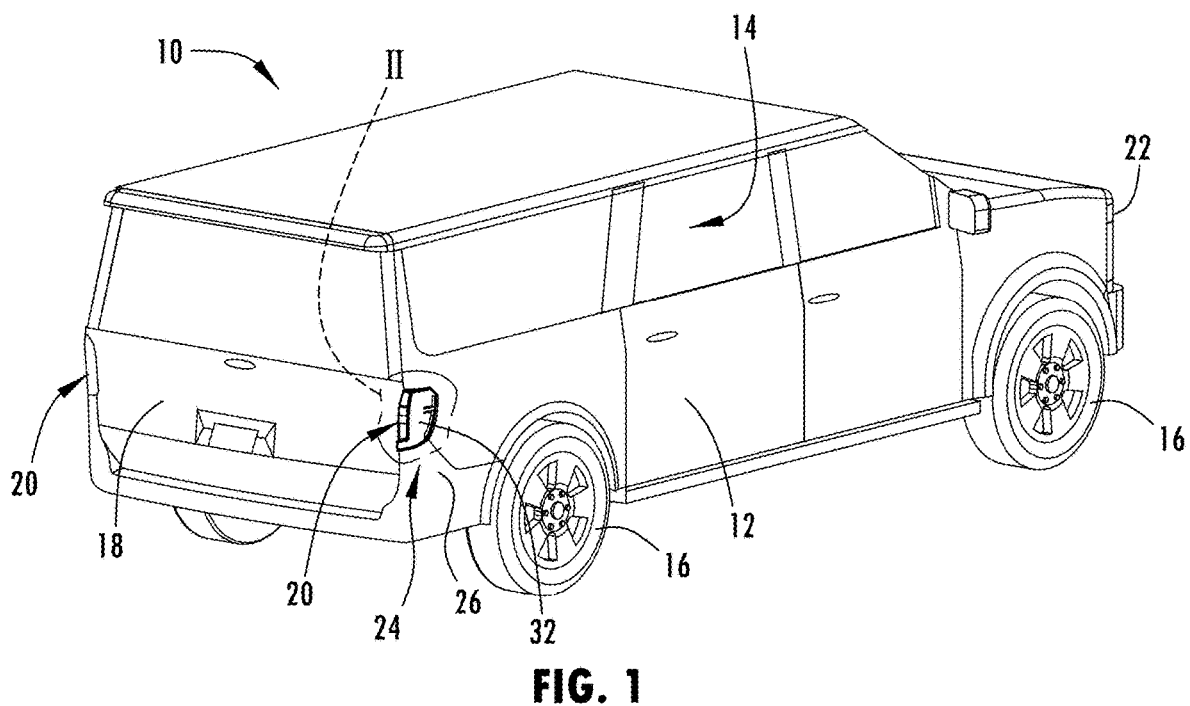
FIG. 1 is an upper rear perspective view of a motor vehicle having a pair of tail lamp assemblies, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle lamp assembly configured as a tail lamp assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, a vehicle lamp assembly 20 is generally shown on the rear end of a motor vehicle 10 configured as a tail lamp assembly having a lamp housing 32 generally configured to house one or more lamps and a light transmitting lens. A fascia assembly 24 is configured to be assembled onto a vehicle. A T-shaped connector 50 is provided on one of the housing 32 and the fascia assembly 24, and a T-shaped slot 52 provided on the other of the housing 32 and the fascia assembly 24. The T-shaped connector 50 is configured to engage the T-shaped slot 52 to align the housing 32 onto the fascia bracket 28 about one side to allow servicing the lamp assembly 20. One or more fasteners 36 are configured to fasten the housing 32 onto the vehicle body 12.

The motor vehicle 10 is shown in FIG. 1 as a wheeled automotive vehicle configured as a sport utility vehicle (SUV), according to one example. The motor vehicle 10 generally includes a vehicle body 12 defining a cabin interior 14. The cabin interior 14 typically includes an arrangement of vehicle seating assemblies, driver controls and other accessories. The vehicle body 12 typically includes a plurality of body panels including moveable closure panels such as doors and a rear liftgate 18 shown at the rear end of the motor vehicle 10 and also includes fascia assemblies that provide trim panels. The motor vehicle 10 is shown as a wheeled vehicle having a plurality of tire and wheel assemblies 16. The motor vehicle 10 may otherwise be configured in other configurations such as a sedan, a truck, a van, a bus, for example, or other styles of motor vehicles.

The motor vehicle 10 is configured with exterior lighting assemblies which include a pair of tail lamp assemblies 20 located on opposite rear end corners of the motor vehicle 10. The tail lamp assemblies 20 are equipped with light sources in the form of lamp bulbs that provide vehicle lighting such as lighting for one or more of running lights, brake lights, reverse lights, turn signal lights, flasher lights, side marker lights and fog lights, for example. The exterior light assemblies also include a pair of head lamp assemblies 22 located on opposite front corners of the motor vehicle 10. The head lamp assemblies 22 may provide high and low beam lighting, turn signal lights, flasher lights, fog lights, side marker lights and daytime running lights, for example. The motor vehicle 10 may include other exterior lighting assemblies such as a Center High Mount Stop Lamp (CHMSL), for example.

Figure 2:
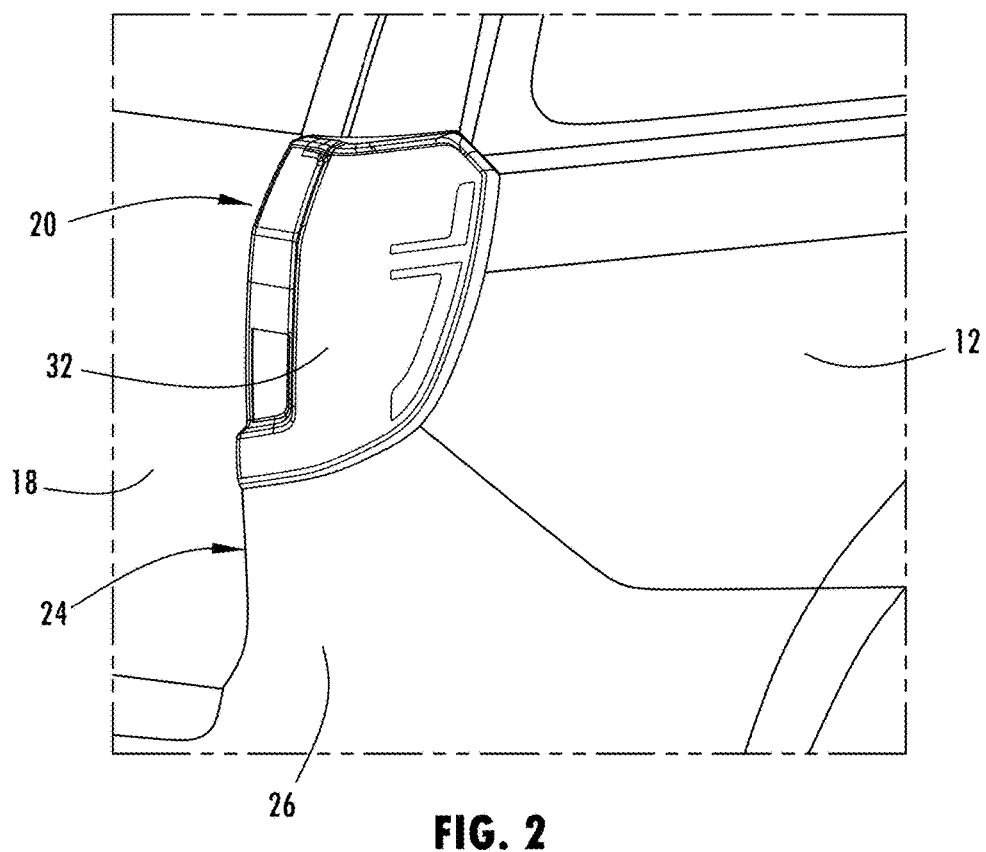
FIG. 2 is a rear side perspective view of a rear portion of the motor vehicle illustrating a tail lamp assembly connected to a fascia assembly.
Figure 3:
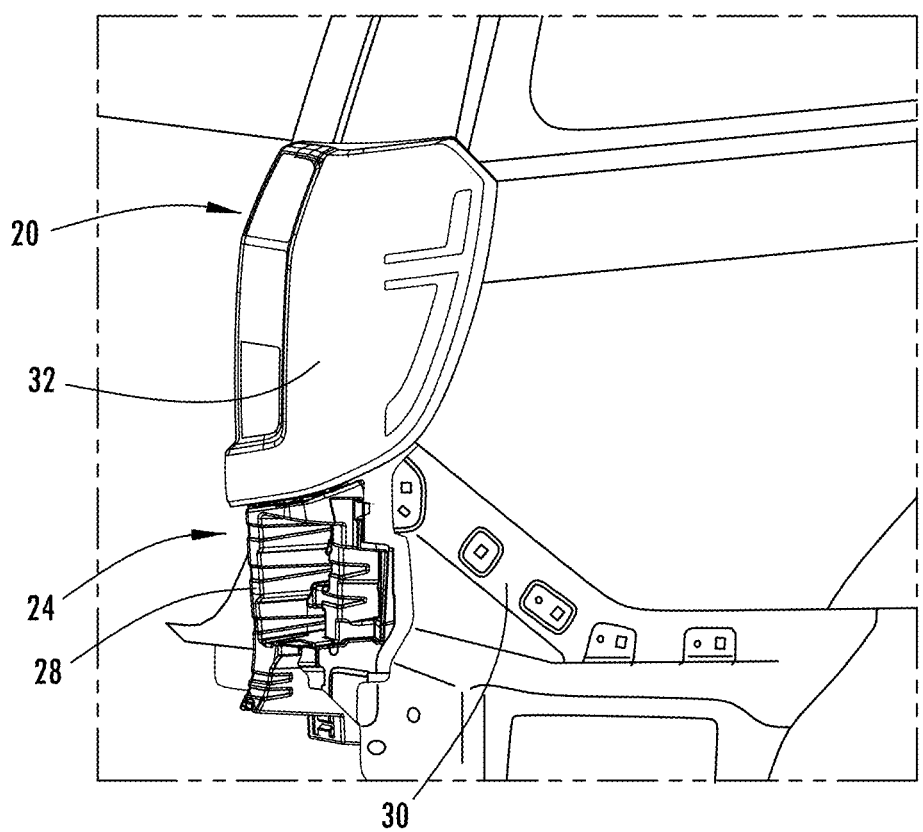
FIG. 3 is a rear side perspective view of the vehicle showing the tail lamp assembly and the fascia assembly with a fascia panel removed.

Referring to FIG. 2, one of the tail lamp assemblies 20 is illustrated at the rear end corner of the motor vehicle 10. The tail lamp assembly 20 generally includes a lamp housing 32 which may include a clear light transmissive lens that is generally configured in a sealed, enclosed arrangement housing one or more lamp bulbs that serve as light sources that extend into a sealed interior 38. The clear light transmissive lens may extend along the rear end and an outside side portion so that light is emitted from the rear end and the outside side portion and is viewable from the rear and outer side of the motor vehicle 10. The tail lamp assembly 20 is generally assembled onto the motor vehicle 10 by aligning with and connecting to a fascia assembly 24 which extends and abuts at least along a portion of the tail lamp assembly 20. The fascia assembly 24 in turn is connected to a support structure 30 on the motor vehicle 10 such as a support pillar or a bracket. The fascia assembly 24 has an underlying fascia bracket 28 as shown in FIG. 3, and a fascia trim panel 26 as shown in FIG. 2 which may be supported on the fascia bracket 28. The fascia assembly 24, particularly the fascia trim panel 26, may cover or abut with one or more body panels defining the vehicle body 12 and abuts the lower portion of the lamp housing 32.

Figure 4:
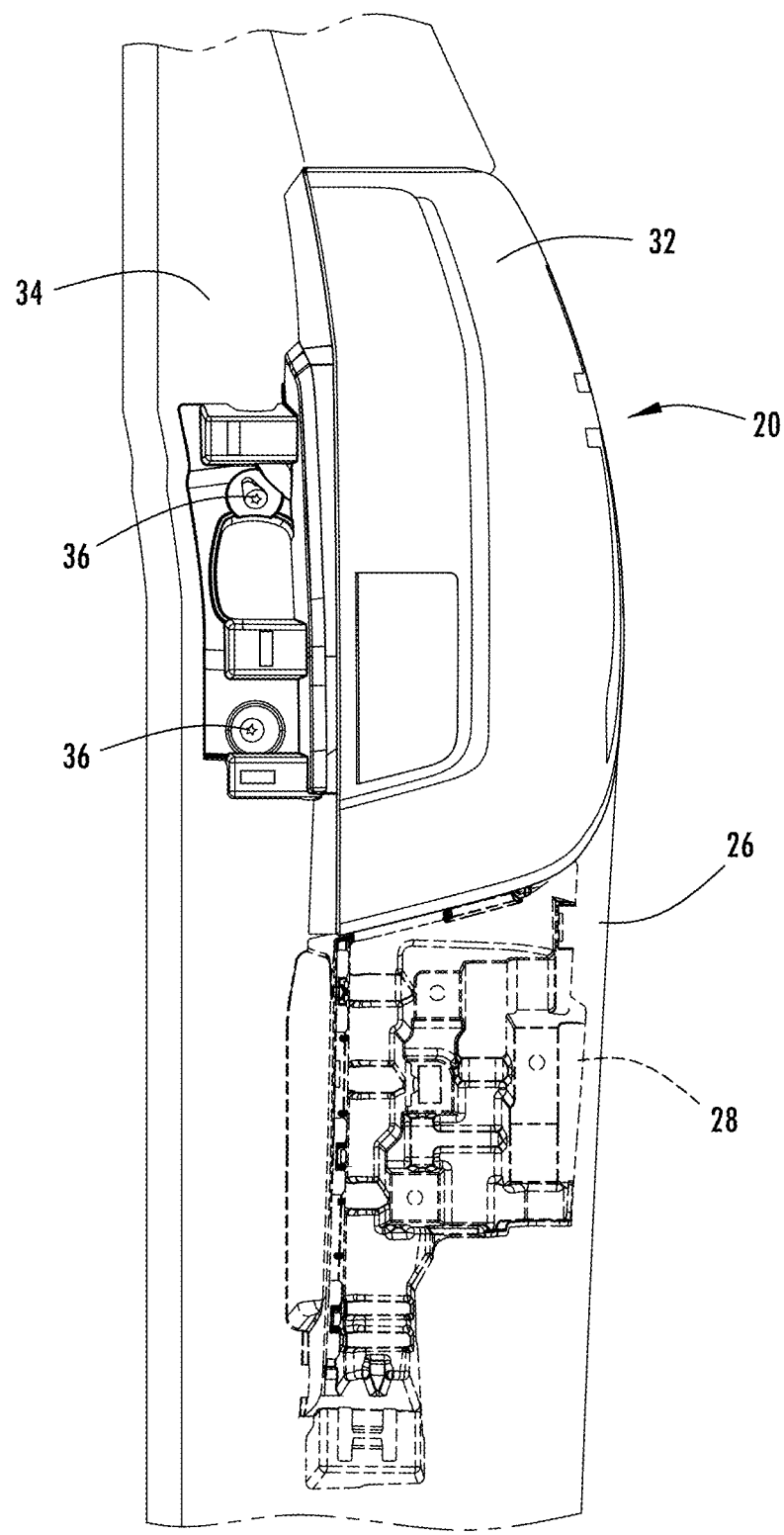
FIG. 4 is a rear view of a rear corner of the motor vehicle with the rear end liftgate in the open position and the fascia panel removed.

Referring to FIG. 4, the tail lamp assembly 20 is generally connected onto the rear end corner of the motor vehicle 10 by employing a pair of fasteners 36, such as threaded screws, which may connect on one side, particularly the in-board side of the tail lamp assembly 20 by fastening onto the liftgate trough 34 which may be sheet metal that is accessible from the rear end of the motor vehicle 10 when the liftgate 18 is in the open position. The tail lamp assembly 20 further includes a T-shaped connector 50 shown in FIGS. 5-7 located on the lower side of the lamp housing 32 and configured to align with and engage a T-shaped slot 52 shown located on the upper side of the fascia bracket 28 to align the housing 32 with the fascia bracket 28 to assemble the two components together. In the embodiment shown, the T-shaped connector 50 is located on a lower end of the housing 32, and the T-shaped slot 52 is located on an upper end of the fascia bracket 28. The T-shaped connector 50 is configured to be aligned with the T-shaped slot 52 and to slide into connection with the T-shaped slot 52 to align the housing 32 onto the fascia bracket 28 and to provide for a bottom end connection. The T-shaped connector 50 may be located on one of the lamp housing 32, and the fascia assembly 24 and the T-shaped slot 52 may be located on the other of the lamp housing 32 and the fascia assembly 24. As such, the T-shaped connector 50 may be located on the fascia bracket 28 and the T-shaped slot 52 may be located on the lamp housing 32 according to another embodiment. The T-shaped slot 52 receives the T-shaped connector 50 and allows the T-shaped connector 50 to enter and slide forward in the T-shaped slot 52 while providing both axial alignment and lateral alignment.

In addition, the housing 32 includes one or more alignment pins 46. In the example shown, a pair of alignment pins 46 are shown configured as studs with arrow-shaped heads that are configured to snap into corresponding grommets on a supporting structure at the rear end of the motor vehicle 10 to help align the positioning of the lamp housing 32 onto the motor vehicle 10.

Figure 5:
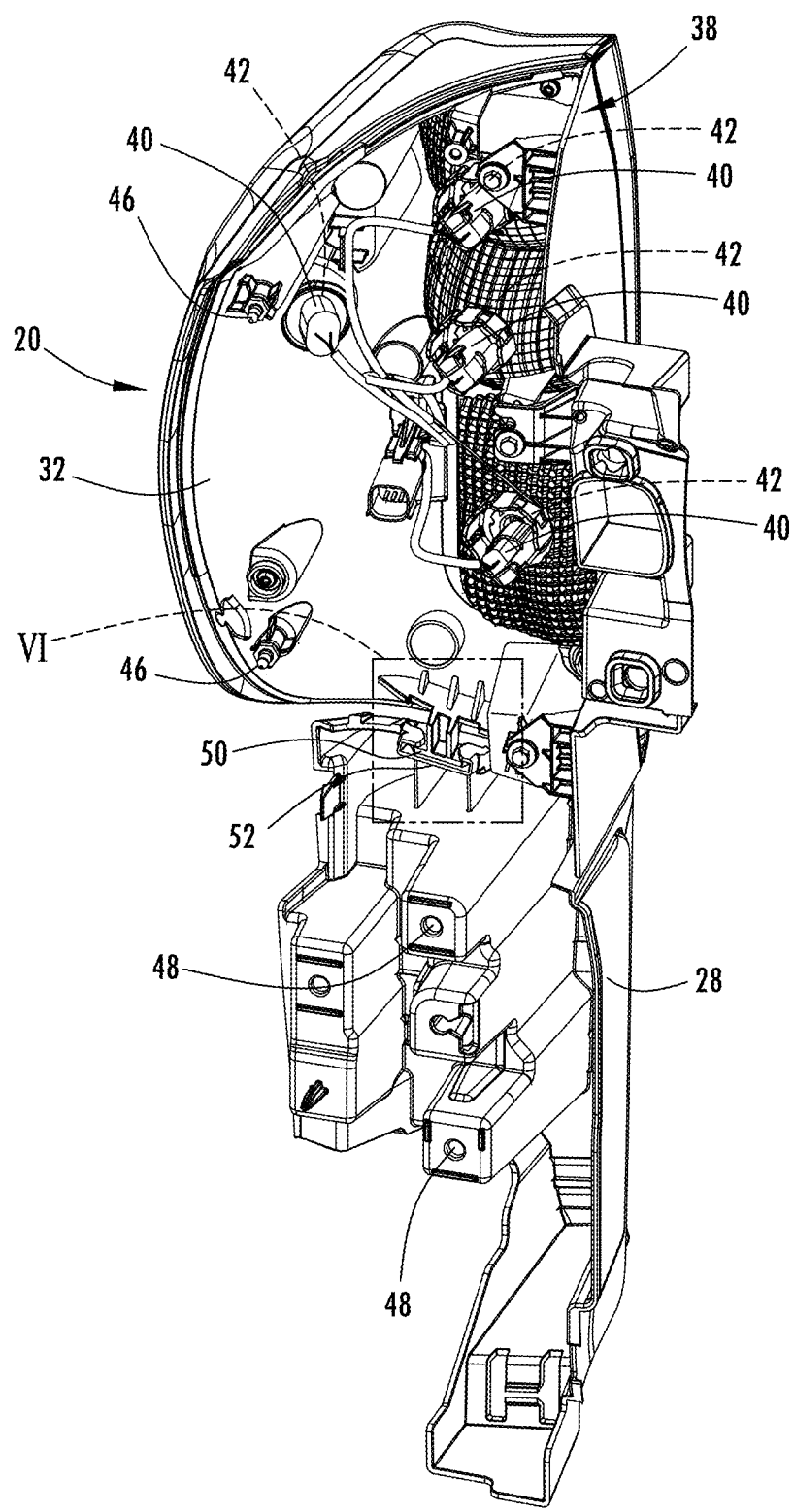
FIG. 5 is a rear perspective view of the tail lamp assembly connected to a fascia bracket of the fascia assembly.
Figure 6:
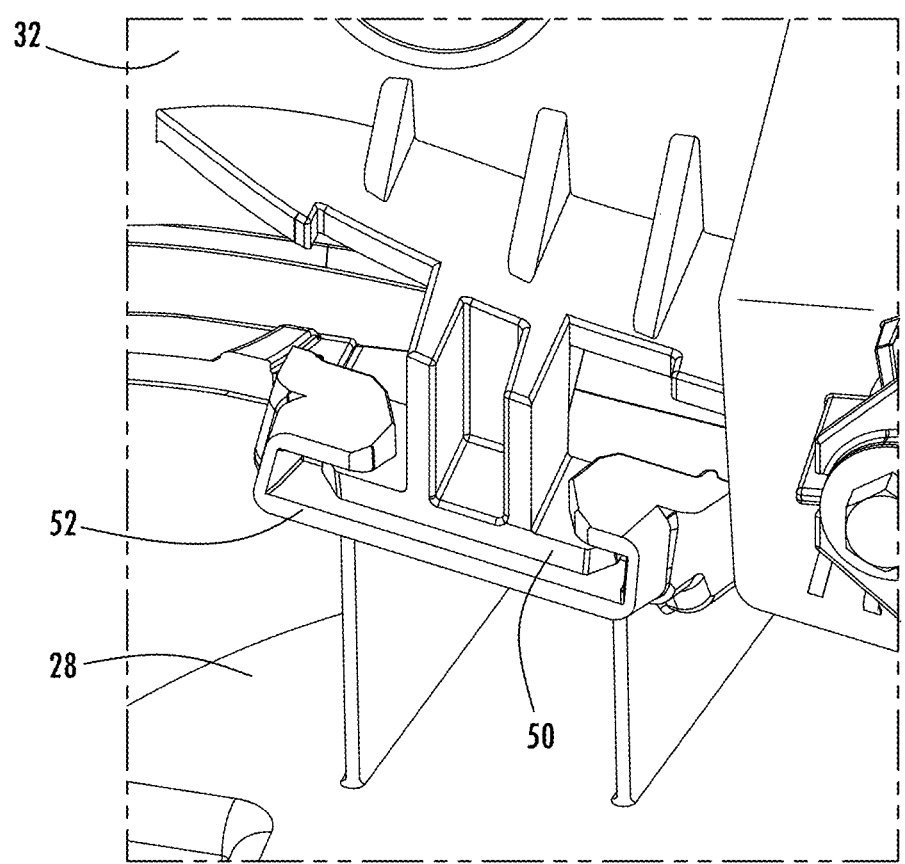
FIG. 6 is an enlarged perspective view of the connection portions of the tail lamp assembly to the fascia bracket.
Figure 7:
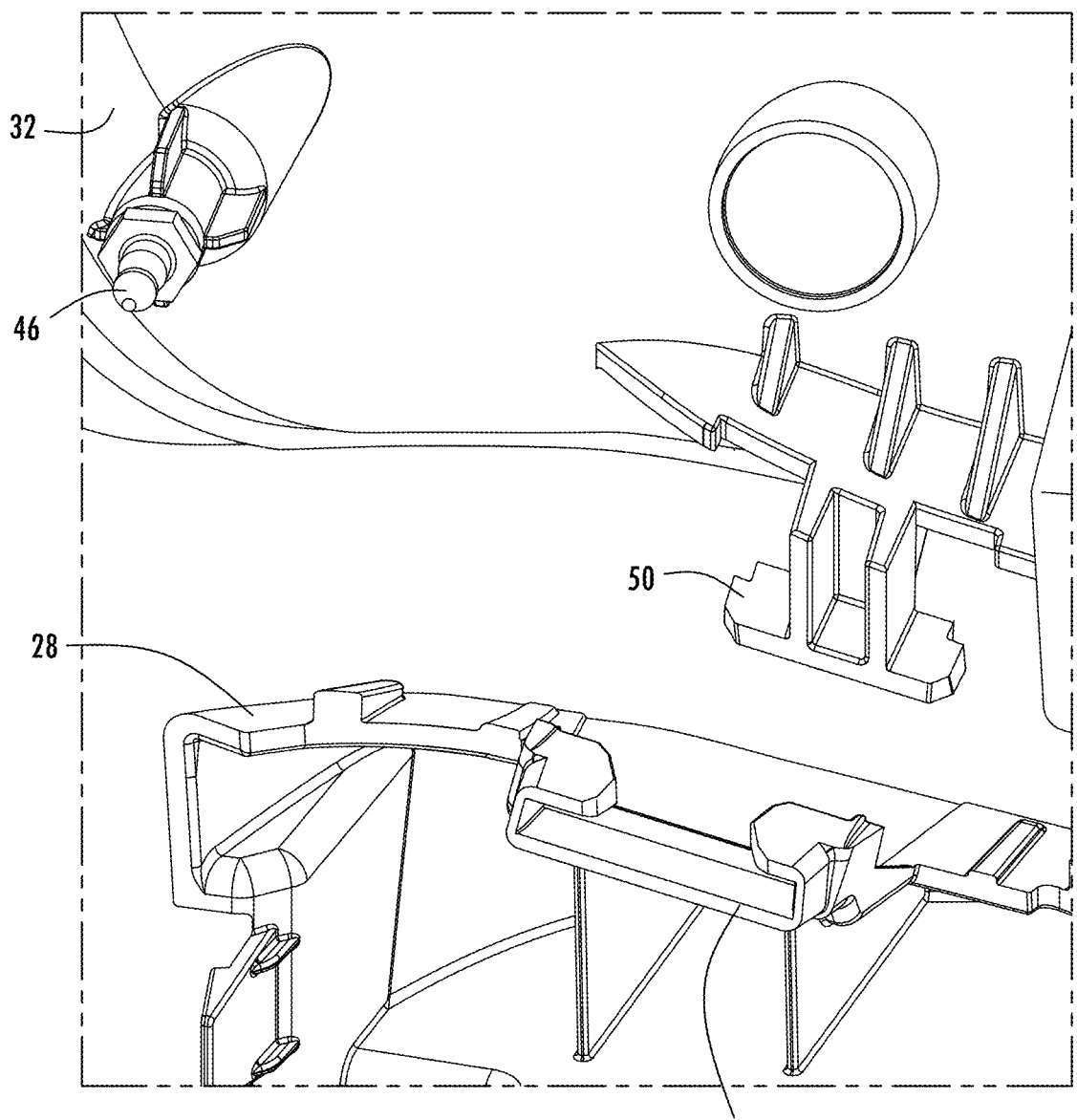
FIG. 7 is an enlarged perspective view of the connecting portions of the tail lamp assembly and fascia bracket prior to assembly.

The lamp housing 32 as shown in FIG. 5 has one or more light bulb receptacles 40 configured to receive lamp bulbs 42. In the example shown, there are four lamp bulbs 42 sealingly assembled on four light bulb receptacles. The lamp bulbs 42 may be removable from the light bulb receptacles 40 by a twist connection or other releasable connection to enable the lamp bulbs 42 to be replaced when the lamp housing 32 is disassembled and removed from connection with the fascia assembly 24. The light bulb receptacles 40 are connected to power cables for supplying electrical power to activate the lamp bulbs 42. The lamp bulbs 42 may include incandescent lamp bulbs, halogen filament lamp bulbs, HID Xenon lamp bulbs and light emitting diode (LED) lamp bulbs such as ballast LED bulbs, for example.

The vehicle lamp assembly 20 advantageously provides for an easy to remove and install assembly that allows for enhanced serviceability such as to allow a user to replace a lamp bulb without having the remove the fascia assembly. The lamp assembly 20 shown and described herein is a vehicle tail lamp assembly, however, the vehicle lamp assembly 20 may be configured as a vehicle head lamp, for example, or other vehicle assembly.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle lamp assembly comprising:
 a housing having a light transmissive lens and one or more light bulb receptacles;
 one or more light bulbs located in the one or more light bulb receptacles;
 a fascia assembly configured to be assembled onto a vehicle;
 a T-shaped connector provided on one of the housing and the fascia assembly;
 a T-shaped slot provided on the other of the housing and the fascia assembly, wherein the T-shaped connector is configured to engage the T-shaped slot to allow the housing to align with the fascia assembly to allow servicing the lamp assembly; and
 one or more fasteners configured to fasten the housing onto the vehicle.

2. The vehicle lamp assembly of claim 1, wherein the vehicle lamp assembly is a vehicle tail lamp assembly.

3. The vehicle lamp assembly of claim 2, wherein the one or more fasteners are located on a vehicle inboard side, and the T-shaped connector and T-shaped slots are located on a lower or outport side.

4. The vehicle lamp assembly of claim 1, wherein the T-shaped connector is located on the housing and the T-shaped slot is located in the fascia assembly.

5. The vehicle lamp assembly of claim 4, wherein the fascia assembly comprises a fascia bracket having the T-shaped slot.

6. The vehicle lamp assembly of claim 5, wherein the fascia assembly further comprises a trim panel coupled to the fascia bracket.

7. The vehicle lamp assembly of claim 1, wherein the T-shaped connector slides within the T-shaped slot.

8. The vehicle lamp assembly of claim 1, further comprising one or more alignment pins configured to aligning the housing with the fascia during assembly of the vehicle lamp assembly onto the motor vehicle.

9. The vehicle lamp assembly of claim 8, wherein the one or more alignment pins comprises one or more studs configured to snap into one or more grommets.

10. The vehicle lamp assembly of claim 1, wherein the one or more lamp bulbs are configured to be removable.

11. A vehicle tail lamp assembly comprising:
a housing having a light transmissive lens and one or more light bulb receptacles;
one or more light bulbs located in the one or more light bulb receptacles;
a fascia assembly configured to be assembled onto a vehicle, wherein the fascia assembly comprises a fascia bracket having the T-shaped slot;
a T-shaped connector provided on one of the housing and the fascia assembly, wherein the T-shaped connector is located on the housing and the T-shaped slot is located in the fascia assembly;
a T-shaped slot provided on the other of the housing and the fascia assembly, wherein the T-shaped connector is configured to engage the T-shaped slot to allow the housing to align with the fascia assembly to allow servicing the lamp assembly; and
one or more fasteners configured to fasten the housing onto the vehicle, wherein the one or more fasteners are located on a vehicle inboard side, and the T-shaped connector and T-shaped slots are located on a lower or outboard side.

12. The vehicle tail lamp assembly of claim 11, wherein the fascia assembly further comprises a trim panel coupled to the fascia bracket.

13. The vehicle tail lamp assembly of claim 11, wherein the T-shaped connector slides within the T-shaped slot.

14. The vehicle tail lamp assembly of claim 11, further comprising one or more alignment pins configured to aligning the housing with the fascia during assembly of the vehicle lamp assembly onto the motor vehicle.

15. The vehicle tail lamp assembly of claim 14, wherein the one or more alignment pins comprises one or more studs configured to snap into one or more grommets.

16. The vehicle tail lamp assembly of claim 11, wherein the one or more lamp bulbs are configured to be removable.

17. A vehicle comprising:
a body;
a fascia assembly assembled onto the body, the fascia assembly, including a fascia bracket; and
a vehicle tail lamp assembly comprising:
a housing having a light transmissive lens and one or more light bulb receptacles;
one or more light bulbs located in the one or more light bulb receptacles;
a fascia assembly configured to be assembled onto a vehicle;
a T-shaped connector provided on one of the housing and the fascia assembly;
a T-shaped slot provided on the other of the housing and the fascia assembly, wherein the T-shaped connector is configured to engage the T-shaped slot to allow the housing to align with the fascia assembly to allow servicing the lamp assembly; and
one or more fasteners configured to fasten the housing onto the vehicle.

18. The vehicle of claim 17, wherein the vehicle lamp assembly is a vehicle tail lamp assembly.

19. The vehicle of claim 18, wherein the one or more fasteners are located on a vehicle inboard side, and the T-shaped connector and T-shaped slots are located on a lower or outport side.

20. The vehicle of claim 17, wherein the T-shaped connector is located on the housing and the T-shaped slot is located in the fascia assembly.

* * * * *